United States Patent [19]

Selverstone

[11] 4,090,112

[45] May 16, 1978

[54] ELECTRICALLY DAMPED OSCILLATION MOTOR

[75] Inventor: Peter Selverstone, Cambridge, Mass.

[73] Assignee: General Scanning, Inc., Watertown, Mass.

[21] Appl. No.: 716,534

[22] Filed: Aug. 23, 1976

[51] Int. Cl.² .......................................... H02K 33/00
[52] U.S. Cl. .................................. 318/128; 318/132; 310/36; 350/6.5; 335/229
[58] Field of Search ............ 350/6; 310/15, 25, 35–39, 310/77, 74; 318/128–132; 335/229, 230, 272

[56] References Cited

U.S. PATENT DOCUMENTS

| | | | |
|---|---|---|---|
| 3,149,274 | 9/1964 | Hetzel | 318/132 X |
| 3,610,973 | 10/1971 | Bauer et al. | 310/15 |
| 3,624,574 | 11/1971 | Montagu | 335/230 |

*Primary Examiner*—Donovan F. Duggan

[57] ABSTRACT

An electrically damped oscillation motor having a stator component, a rotor component, a permanent magnet which provides a magnetic field across the annular gap transverse to the axis of rotation of the rotor and a drive winding for passing an electric current that interacts with the magnetic field to produce rotational deflection of the rotor. Both a tachometer winding and a compensation winding are provided in fixed relation to the drive winding, the compensation winding being located at a greater radial distance from the annular gap than the tachometer winding, and the tachometer and compensation windings being connected together in circuit so that the signal induced in the tachometer winding due to electric current flow in the drive winding is cancelled by a similar signal induced in the compensation winding, while the tachometer and compensation windings provide a net velocity signal that is used to modify the electric current flow in the drive winding to electrically damp rotational motion of the rotor.

11 Claims, 8 Drawing Figures

U.S. Patent  May 16, 1978  Sheet 1 of 3  4,090,112
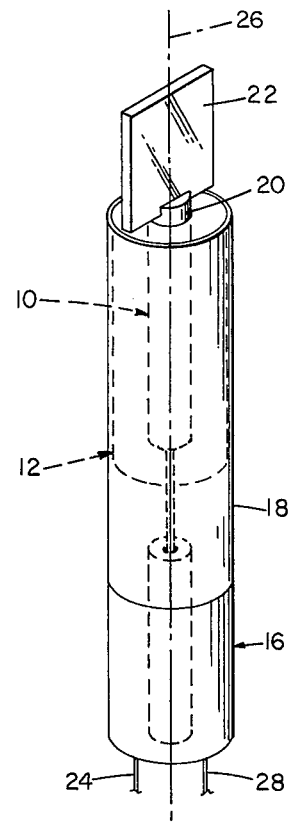
FIG 1
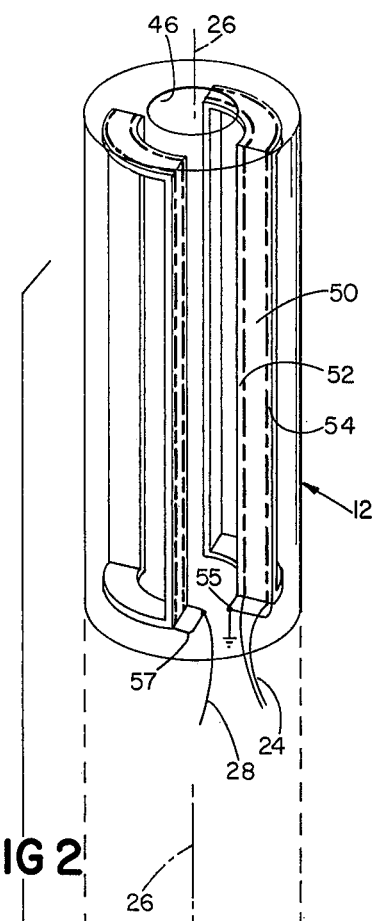
FIG 2
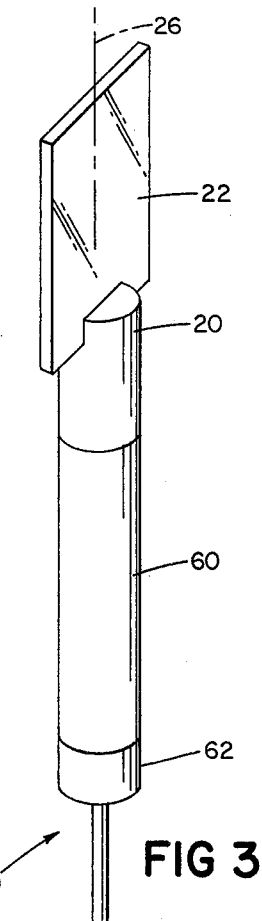
FIG 3
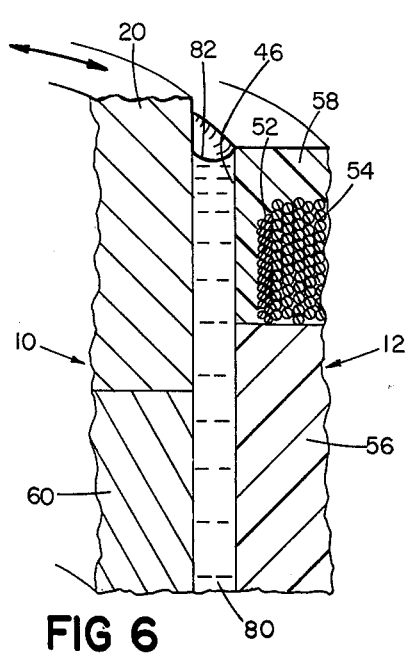
FIG 6
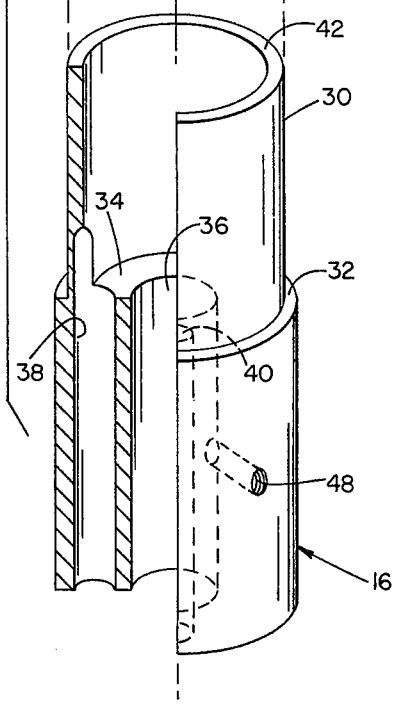

ELECTRICALLY DAMPED OSCILLATION MOTOR

SUMMARY OF THE INVENTION

This invention relates to electromechanical transducers and more particularly to oscillation motors useful to deflect, scan, interrupt or chop beams of light, ions, electrons, or other similar streams of low mass.

Oscillation motors are useful in a variety of applications such as in facsimile machines, optical scanners and video recorders. The rotor of the oscillation motor is driven by torque produced by interaction between an electric drive current and a magnetic field and such motors are useful wherever limited rotation of an element in response to the electric drive currents with a high degree of accuracy is needed. Despite the general acceptance of oscillation motors in such scanning and other applications, a major limitation on their range of usefulness stems from the fact that inertia prevents the instanteous stopping of the rotor with positional accuracy and in synchronism with the drive signal when it must move from one position to another position quickly. The dynamic response of such oscillation motor is accordingly damped. Viscous damping is frequently employed, for example by providing a fluid in the gap between the rotor and stator, but has the major disadvantage that the damping is temperature dependent as the viscosity of the fluid changes markedly over the range of temperatures in the operational environment, e.g. from 0°–150° C. Damping may also be provided electrically by a signal related to the velocity of rotor motion that is fed back for damping the rotor. However, that velocity signal frequently includes and is distorted by a signal that is a function of the drive current.

It is an object of this invention to provide a novel and improved oscillation motor with improved electrical damping. Another object of this invention is to provide an electrically damped oscillation motor which may be manufactured conveniently and economically.

The invention features an oscillation motor having a stator component and a rotor component supported within the stator with an annular gap therebetween. A permanent magnet provides a magnetic field across the annular gap transverse to the axis of rotation of the rotor and a drive winding is provided on either the stator or the rotor for passing an electric current that interacts with the magnetic field to produce rotational deflection of the rotor. Both a tachometer winding and a compensation winding are provided in fixed relation to the drive winding, the compensation winding being located at a greater radial distance from the annular gap than the tachometer winding, and the tachometer and compensation windings being connected together in circuit so that the signal induced in the tachometer winding due to electric current flow in the drive winding is cancelled by a similar signal induced in the compensation winding. Rotor movement produces velocity signals in the tachometer and compensation windings and those windings are arranged to provide a net velocity signal that is used to modify the electric current flow in the drive winding to electrically damp rotational motion of the rotor.

In preferred embodiments, the rotor support system provides essentially no viscous damping, damping being obtained solely from the velocity signal; the drive, tachometer, and compensation windings are on the stator component and the permanent magnet is carried by the rotor component. The permanent magnet is fixed in axial position within a stator cavity by a torsion shaft that is axially aligned with the axis of the rotor and that has one end secured to the permanent magnet and its other end secured to the stator for permitting limited rotational oscillation of the permanent magnet. A beam modifying element is secured to the free end of the rotor. The drive winding on the stator is disposed between the tachometer winding and the compensation winding and a metal sleeve that surrounds the stator provides flux concentration adjacent the compensation winding. In this configuration, the tachometer winding has at least twice as many turns as the compensation winding but the winding and flux concentration arrangements are such that the signals induced in the compensation and tachometer windings due to flow of drive current in the drive winding are equal. Due to the larger number of turns of the tachometer winding and its greater proximity to the annular gap and the permanent magnet, the velocity signal induced in the tachometer winding is much greater than the velocity signal induced in the compensation winding so that a substantial net velocity signal is provided by the tachometer-compensation winding circuit for electrically damping rotational motion of the rotor.

The invention provides compact, inexpensive and reliable oscillation motors that have peak-to-peak rotor excursions of up to 60°. The oscillation motors are economically produced in mass production quantities, and provide accurate and high speed response to sinusoidal, ramp and other wave forms over a wide range of repetition rates.

Other features and advantages of the invention will be seen as the following description of a particular embodiment progresses in conjunction with the drawings, in which:

FIG. 1 is a perspective view of an oscillation motor in accordance with the invention;

FIG. 2 is a diagrammatic perspective view of the stator and base components of the motor of FIG. 1.

FIG. 3 is a diagrammatic perspective view of the rotor and torsion shaft components of the motor of FIG. 1;

FIG. 6 is a cross sectional view of a portion of the annular gap at an enlarged scale and taken along the line 6—6 of FIG. 5.

DESCRIPTION OF PARTICULAR EMBODIMENT

Figure 2A:
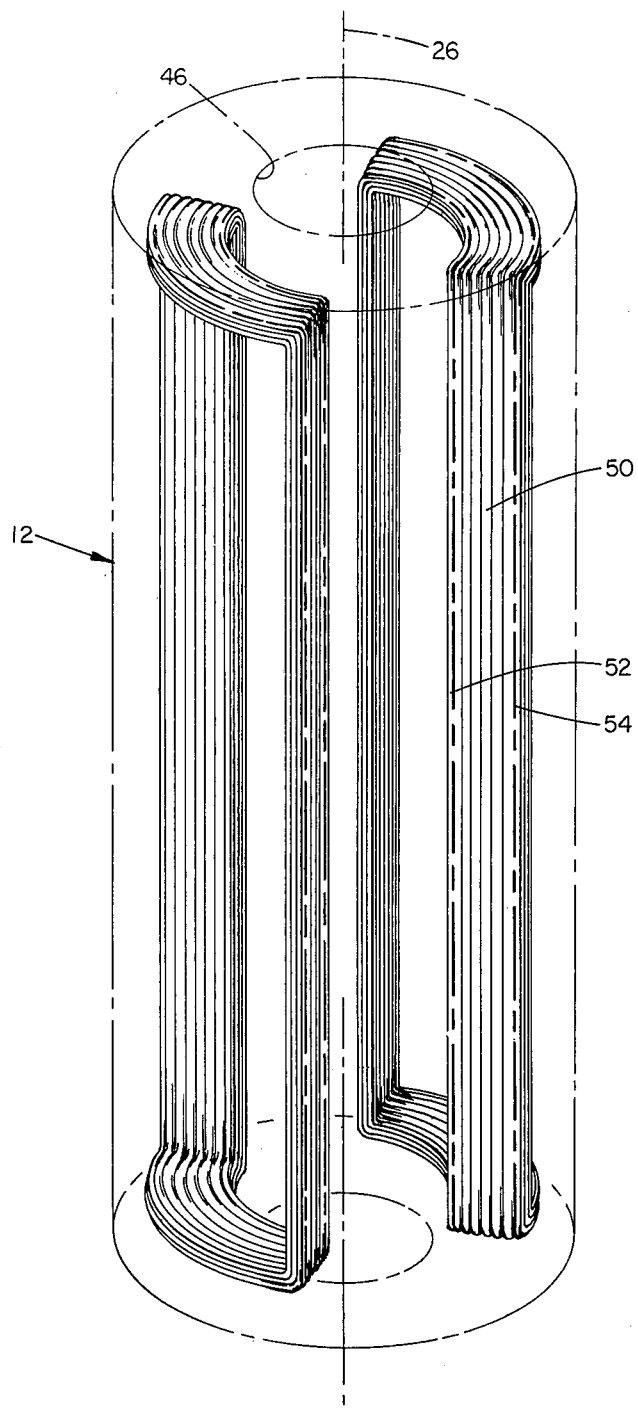
FIG. 2a is a perspective view of the stator component at a larger scale.

The oscillation motor shown in FIG. 1 has rotor component 10 and a stator component 12 in a cylindrical assembly that is one half inch in diameter and 2 inches in length. That motor includes a brass base 16 and a sleeve 18 of a low loss nickel-iron alloy. The output shaft 20 of rotor 10 carries a front surfaced mirror 22 that is attached to shaft 20 with an epoxy adhesive. Drive signals applied over leads 24 produce a reactive torque that rotates shaft 20 and mirror 22 about axis 26. Velocity signals generated in response to rotation of shaft 20 are supplied over lead 28.

With reference to FIG. 2, the base 16 is designed for mounting in a suitable heat sink member of high thermal conductivity and includes at its upper end a tubular section 30, one half inch in length and 0.12 inch in thickness; an outer annular surface 32 on which the lower end of sleeve 18 is seated; and an inner annular surface 34 in which a central passage 36 and two passages 38, 40 for leads 24, 28, respectively are formed. Threaded radial passage 48 receives a set screw. Seated on the upper surface 42 of tubular section 30 is stator component 12 of plastic material one inch in length, and 0.45 inch in diameter that has a cylindrical surface 46 defining a cavity 0.125 inch in diameter. Encapsulated within stator component 12 are drive winding 50 (350 turns of No. 34 wire), tachometer winding 52 (50 turns of No. 38 wire) and compensation winding 54 (20 turns of No. 38 wire). Each of these windings is formed in two connected coils on automatic coil winding machinery, the six formed coils are then positioned (three each) on two bobbins 56 and then the six coils are encapsulated with epoxy resin 58 to provide the stator assembly 12 as shown in FIG. 2. Thus each winding 50, 52 and 54 is distributed with equal halves on opposite sides of cavity 46 as indicated in FIGS. 2 and 2a. The tachometer and compensation windings 52, 54 are connected in series opposition as diagrammatically indicated at 55 and 57 and connected to lead 28. The drive winding 50 is connected to leads 24.

The rotor component 10 on which mirror 22 is mounted is shown in FIG. 3 and includes a samarium cobalt permanent magnet 60 that is 0.62 inch in length and 0.120 inch in diameter. The magnet has a residual induction value of at least 7500 Gauss, a coercive force of 7000 Oersteds and a transverse direction of magnetization with a north pole extending axially along one side and an axially extending south pole at the diammetrically opposite surface as indicated in FIG. 6. Bonded to the upper end of magnet 60 with an epoxy adhesive is aluminum mirror mount shaft 20 that is 0.120 inch in diameter. Similarly bonded to the lower end of magnet 60 is aluminum torsion shaft mount 62 that is also 0.120 inch in diameter. Torsion shaft 64 is a cylindrical rod of high carbon steel 0.016 inch in diameter and with an exposed length of 0.75 inch. The upper end of shaft 64 is received in and secured to mount 62 and the lower end of shaft 64 is received in and secured to cylindrical stainless steel holder 66 that has a diameter of 0.1245 inch and a length of 0.75 inch.

The oscillation motor is assembled by inserting leads 24 and 28 through passages 38 and 40, respectively in base 16 and seating the lower surface of the stator component 12 on annular surface 42. Sleeve 18 is then telescopically slid over stator 12 and tubular section 30 and seated on surface 32 of base 16 thus axially aligning the stator 12 and base 16. A mandral is inserted through the aligned stator and base components and the stator is impregnated with epoxy 58. The mandral is then removed and the torsion bar holder 66 is then inserted through cavity 46 of the stator and into the passage 36 of base 16 and secured in position by a set screw received in threaded bore 48. Magnet 60 as supported on shaft 64 is fixed in axial position in cavity 46 as shown in FIG. 4.

Figure 4:
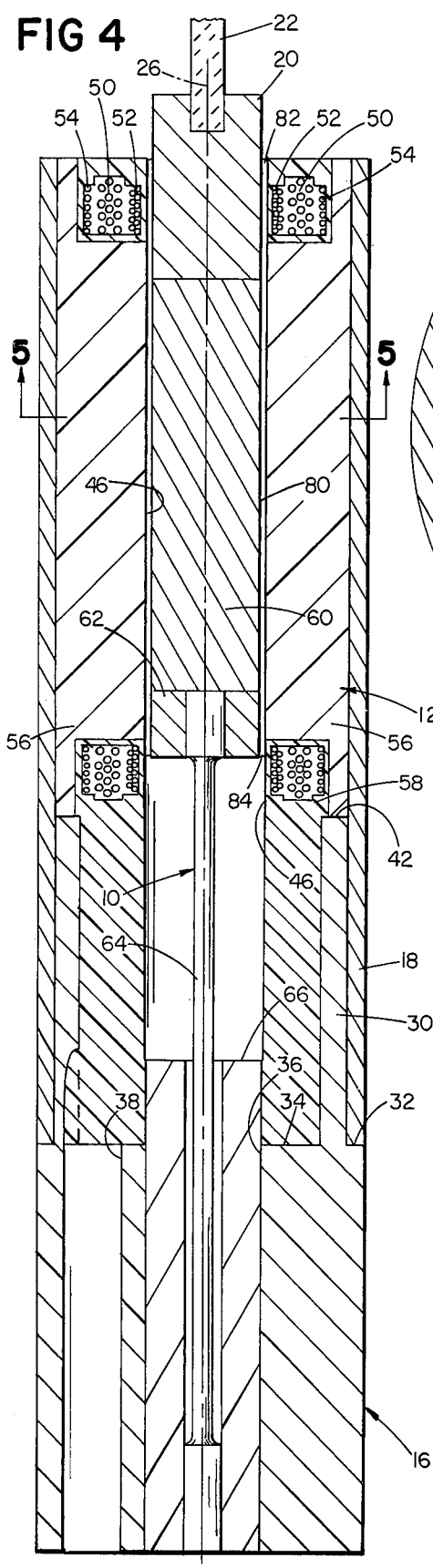
FIG. 4 is a sectional view of the motor of FIG. 1.

As seen in FIGS. 4 and 6, when the rotor-torsion shaft assembly is so secured in the stator-base assembly, magnet 60 is in stator cavity 46 with mirror mounting shaft 20 at the upper end of the stator cavity and torsion shaft mount 62 at the lower end of cavity 46 so that an annular space of 0.0025 inch radial width is provided along the length of the cylindrical cavity 46. Another similar oscillation motor employs a permanent magnet rotor that is 0.62 inch long and 0.18 inch in diameter and has radial gap width of 0.0035 inch. In both motors, the surfaces of both mirror shaft 20 and torsion mount 62 have dimensional tolerances of ±0.001 inch. A layer of liquid 80 of 100 centipoise viscosity extends along the length of this space with an upper annular meniscus 82 between the mirror shaft 20 and the upper end of stator cavity 46 and a lower annular meniscus 84 between the lower end of torsion bar mounting member 62 and cavity 46. This annular liquid layer provides forces tending to maintain the rotor assembly 10 radially centered within the stator bore 46 while imposing essentially no viscous damping on the rotor. Silicone oils, hydrocarbon oils and polymeric liquids are suitable low viscosity liquids. Liquids of somewhat higher viscosity may be used with motors that have larger annular gaps, for example a liquid with viscosity of up to 1000 centipoises may be used in a motor with a larger annular gap. In a particular embodiment a diester liquid with dispersed magnetic particles of 100 Angstrom average dimension is maintained in the annular gap by the magnetic field furnished by magnet 60.

The motor has an amplification factor Q (the ratio of amplitude with a given input current (e.g. 1 milliampere) at resonant frequency to the amplitude attained with the same input current at 10 Hertz) of ten and a resonant frequency of 500 Hertz. A current of 10 milliamperes applied to drive coil 50 at resonant frequency produces angular rotation of ±10° of mirror 22. When the rotor 10 is in motion, hydrodynamic forces tend to increase its radial stability. When driven with a current sensing amplifier, the amplitude frequency response of the motor is under damped. Damping control is provided by feedback of a rotor velocity signal from tachometer winding 52.

Figure 5:
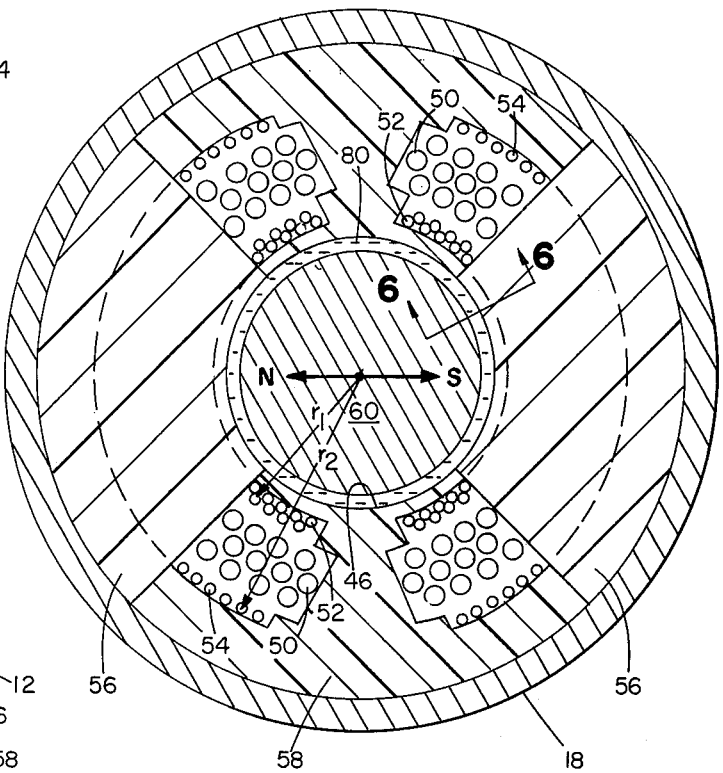
FIG. 5 is a cross sectional view taken along the line 5—5 of FIG. 4.

As indicated above and as shown in FIGS. 2, 4 and 5, the stator 12 has three windings, a three-hundred fifty turn drive winding 50, a 50-turn tachometer winding 52 and a twenty-turn compensation winding 54. Tachometer winding 52 is inside drive winding 50 immediately adjacent surface 46 and spaced at radius $r_1$ from axis 26; while compensation winding 54 is outside drive winding 50 and spaced at radius $r_2$ from axis 26 as indicated in FIG. 6. Tachometer winding 52 and compensation winding 54 each provide a low impedance signal of form:

$K\omega \, d\theta/dt + K_T \, dI/dt,$ where $\theta$ is the angular position of the rotor and I is the drive current. The first term of the equation ($K\omega \, d\theta/dt$) is due to rotation of magnet 60 and the second term of the equation ($K_T \, dI/dt$) is due to mutual inductance between the drive winding 50 and the tachometer winding 52 or the compensation winding 54. The number of turns of the tachometer and compensation windings 52, 54 are selected as a function of their respective positions so that the coefficient $K_T$ of winding 52 is the same as the coefficient $K_T$ of winding 54, winding 54 having fewer turns in this embodiment due to its proximity to sleeve 18. Windings 52 and 54 are connected in series opposition so that the signals induced in those windings due to drive current flow in winding 50 cancel. (A balancing potentiometer may be connected in circuit between windings 52 and 54 and lead 28 to provide a trimming cancellation adjustment of the mutual inductance signals if desired.) The coefficient $K_\omega$ of tachometer winding 52 is approximately twice the coefficient $K_\omega$ of compensation winding 54 so that the net voltage on lead 28 is due to rotation of rotor 10 and is proportional to the angular velocity of the rotor.

Figure 7:
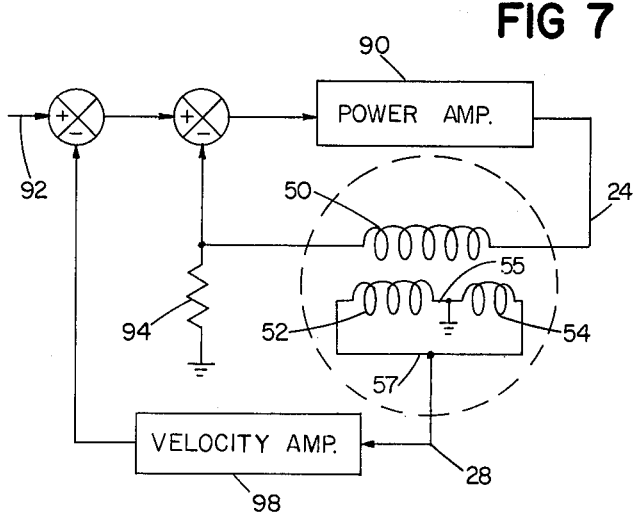
FIG. 7 is a schematic diagram of drive circuitry for the oscillation motor of FIG. 1.

A block diagram of the motor drive circuitry is shown in FIG. 7. That circuitry includes power amplifier 90 connected to respond to a drive signal applied at input 92 and to supply drive current to drive winding 50. The voltage across one ohm sensing resistor 94 is fed back to provide a power amplifier gain of one ampere per volt. Tachometer winding 52 and compensation winding 54 are connected in series opposition by connections 55, 57 and the winding loop is connected to lead 28. The mutual inductance signals are equal in magnitude and buck each other and the resulting net velocity signal is applied over lead 28 to velocity amplifier 98 and fed back to modify the drive signal and damp the angular response of the oscillation motor.

It will be understood that numerous variations in the specific details will occur and are within the spirit and scope of the invention.

What is claimed is:

1. An oscillation motor comprising a stator, a rotor supported within said stator with an annular gap therebetween, a permanent magnet providing a magnetic field across said annular gap transverse to the axis of rotation of said rotor, a drive winding on either said rotor or said stator for passing an electric current that interacts with said magnetic field to produce rotational deflection of said rotor, a tachometer winding in fixed relation to said drive winding, a compensation winding in fixed relation to said drive winding and at a greater radial distance from said annular gap than said tachometer winding, and circuitry connecting said tachometer winding and said compensation winding together to produce a net velocity signal for electrically damping said rotor as a function of the angular velocity of said rotor while cancelling mutual inductance signals induced in said tachometer and compensation windings by flow of electric current in said drive winding.

2. The motor of claim 1 wherein said rotor has a support system that provides essentially no viscous damping and said rotor is damped solely in response to said velocity signal.

3. The motor of claim 1 wherein said permanent magnet is carried by said rotor and said drive, tachometer and compensation windings are on said stator.

4. An oscillation motor comprising a stator, a rotor supported within said stator with an annular gap therebetween, a permanent magnet on said stator providing a magnetic field across said annular gap transverse to the axis of rotation of said rotor, a drive winding on said stator for passing an electric current that interacts with said magnetic field to produce rotational deflection of said rotor, a tachometer winding on said stator in fixed relation to said drive winding, a compensation winding on said stator in fixed relation to said drive winding and at a greater radial distance from said annular gap than said tachometer winding, circuitry connecting said tachometer winding and said compensation winding together to produce a net velocity signal as a function of the angular velocity of said rotor while cancelling mutual inductance signals induced in said tachometer and compensation windings by flow of electric current in said drive winding, and a sleeve of low loss material surrounding said stator and providing flux concentration adjacent said compensation winding.

5. The motor of claim 1 wherein said rotor is supported by a torsion shaft member that is axially aligned with the axis of said rotor with one end secured to the rotor and its other end secured to the stator for fixing the axial position of said rotor relative to said stator while permitting limited rotational oscillation of said rotor.

6. An oscillation motor comprising a stator, a rotor within said stator with an annular gap therebetween, a torsion shaft member axially aligned with the axis of said rotor with one end secured to the rotor and its other end secured to the stator for fixing the axial position of said rotor relative to said stator while permitting limited rotational oscillation of said rotor, a beam modifying element secured to the end of said rotor opposite said torsion shaft, a permanent magnet providing a magnetic field across said annular gap transverse to the axis of rotation of said rotor, a drive winding on either said rotor or said stator for passing an electric current that interacts with said magnetic field to produce rotational deflection of said rotor, a tachometer winding in fixed relation to said drive winding, a compensation winding in fixed relation to said drive winding and at a greater radial distance from said annular gap than said tachometer winding, and circuitry connecting said tachometer winding and said compensation winding together to produce a net velocity signal as a function of the angular velocity of said rotor while cancelling mutual inductance signals induced in said tachometer and compensation windings by flow of electric current in said drive winding.

7. The motor of claim 1 wherein said tachometer winding has at least twice as many turns as said compensation winding.

8. The motor of claim 1 wherein said drive winding is positioned between said tachometer winding and said compensation winding.

9. An oscillation motor comprising a stator, a rotor supported within said stator with an annular gap therebetween, a permanent magnet of a rare earth cobalt alloy carried by said rotor and providing a magnetic field across said annular gap transverse to the axis of rotation of said rotor, a drive winding on said stator for passing an electric current that interacts with said magnetic field to produce rotational deflection of said rotor, a tachometer winding on said stator in fixed relation to said drive winding, a compensation winding on said stator in fixed relation to said drive winding and at a great radial distance from said annular gap than said tachometer winding, said drive winding being positioned between said tachometer winding and said compensation winding, circuitry connecting said tachometer winding and said compensation winding together to produce a net velocity signal as a function of the angular velocity of said rotor while cancelling mutual inductance signals induced in said tachometer and compensation windings by flow of electric current in said drive winding, and a sleeve of low loss material surrounding said stator and provideing flux concentration adjacent said compensation winding.

10. The motor of claim 9 wherein said rotor is supported by a torsion shaft member that is axially aligned with the axis of said rotor with one end secured to the rotor and its other end secured to the stator for fixing the axial position of said rotor relative to said stator while permitting limited rotational oscillation of said rotor, and further including a beam modifying element fixed at the end of said rotor opposite said torsion shaft, said rotor support system providing essentially no viscous damping and said rotor being damped solely in response to said velocity signal.

11. The motor of claim 10 wherein said tachometer winding has at least twice as many turns as said compensation winding and said drive winding is positioned between said tachometer winding and said compensation winding.

* * * * *